US007342613B2

(12) United States Patent
Crinon (10) Patent No.: US 7,342,613 B2
(45) Date of Patent: Mar. 11, 2008

(54) METHOD AND SYSTEM FOR INSERTING CLOSED CAPTIONS IN VIDEO

(75) Inventor: Regis J. Crinon, Camas, WA (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 10/973,996

(22) Filed: Oct. 25, 2004

(65) Prior Publication Data

US 2006/0087586 A1 Apr. 27, 2006

(51) Int. Cl.
*H04N 7/00* (2006.01)
*H04N 11/00* (2006.01)

(52) U.S. Cl. .................................. 348/468; 348/473

(58) Field of Classification Search ................ 348/460, 348/465, 468, 461, 473, 474
See application file for complete search history.

(56) References Cited

U.S. PATENT DOCUMENTS 5,541,662 A * 7/1996 Adams et al. .............. 348/460
6,885,406 B2 * 4/2005 Yui et al. .................... 348/564
7,106,381 B2 * 9/2006 Molaro et al. .............. 348/468

OTHER PUBLICATIONS

"ATSC Standard: Digital Television Standard (A53), Revision C Including Amendment No. 1," *Advanced Television Systems Committee*, Jul. 2004, 114 pages.
"EIA Standard, Line 21 Data Services, EIA/CEA-608B (Revision of EIA-608-A)," *Electronic Industries Alliance*, Oct. 2000, 154 pages.

* cited by examiner

*Primary Examiner*—M. Lee
(74) *Attorney, Agent, or Firm*—Klarquist Sparkman, LLP (57) ABSTRACT

A closed captioning configuration system is described. The system receives parameters of a digital video presentation and computes closed captioning parameters to drive a closed captions encoder, creating closed captions which are compatible with the presentation. In various implementations, the configuration system may be integrated into a video encoder, a closed captions encoder, or both. The configuration system, through analysis of the presentation parameters, can drive captioning for presentations which may differ by frame rate, interlacing, or frame encoding mode, and account for repetition of fields or frames.

20 Claims, 7 Drawing Sheets

| Example | Frame Rate (fps) | Interlace | Pull-down | Frame Encoding Mode | First field repeated | Frame repeat (times) | closed captioning count | NTSC+DTV data (bytes) |
|---|---|---|---|---|---|---|---|---|
| 1 | 60 or 59.94 | no | yes or no | n/a | n/a | 0 | 10 | 2+18 |
| 2 | 60 or 59.94 | no | yes | n/a | n/a | 1 | 20 | 4+36 |
| 3 | 60 or 59.94 | no | yes | n/a | n/a | 2 | 30 | 6+54 |
| 4 | 30 or 29.97 | no | yes or no | n/a | n/a | 0 | 20 | 4+36 |
| 5 | 30 or 29.97 | no | yes | n/a | n/a | 1 | 30 | 6+54 |
| 6 | 30 or 29.97 | yes | yes | progressive | no | n/a | 20 | 4+36 |
| 7 | 30 or 29.97 | yes | yes | progressive | yes | n/a | 30 | 4+36 |
| 8 | 30 or 29.97 | yes | yes | frame interlaced or field interlaced | no | n/a | 20 | 4+36 |
| 9 | 24 or 23.97 | no | no | n/a | n/a | 0 | 25 | 4+46 or 6+44 |

Examples of Video and Closed Captioning Parameters

Fig. 7

METHOD AND SYSTEM FOR INSERTING CLOSED CAPTIONS IN VIDEO

TECHNICAL FIELD

The invention relates generally to the inclusion of information into digital video.

BACKGROUND

For years, providers of video entertainment have included closed captioning information in order to provide a satisfying viewing experience for viewers with hearing difficulties or for those watching video in noisy environments. Existing methods of including closed captioning information for analog television, such as the EIA-608 standard, take advantage of sections of the analog NTSC broadcast signal which are not displayed in order to include ASCII-encoded characters for each broadcast frame. The EIA-608 standard is also know as the "Line 21" standard, named because closed captioning information is stored in line 21 of the vertical blanking interval.

While EIA-608 allows for one form of closed captioning, the technique can only encode two bytes of data per frame, and thus does not provide very much control over the types of characters in the captioning or their placement. Additionally, it is necessarily constrained by the NTSC broadcast television standard. As such, EIA-608 is limited to the frame rate at which NTSC broadcasts, or 59.94 interlaced video fields per second.

With the advent of digital video technologies, the vertical blanking interval was no longer being used, and as such a new standard was required. One solution for closed captioning in digital environments is found in the EIA-708 standard, which encapsulates data encoded as to the EIA-608, allowing this NTSC-based standard data to be tunneled in the user data of a digital video signal.

However, although systems exist to insert EIA-608 data into digital video, this standard is, at its heart, based on NTSC parameters. As such increased complexity is added when video must be captioned that differs in aspects from the NTSC standard. Examples of aspects include, but are not limited to things such as frame rate, the use of interlaced vs. progressive video, the use of 3:2 pulldown to upsample content shot at 24 frames/sec to regular NTSC video frame rate of 29.97 frames/sec, and the manner in which frames are encoded. Thus, for example, a video sample that runs at a higher frame rate will need additional bytes of closed captioned data, in order that sufficient data exists to allow a caption to be displayed for a given amount of time. What is needed is a system for accounting for these aspects, examining them, and creating closed captioning that is properly configured for the digital video to which it is being added.

SUMMARY

A closed-captioning configuration system is described. In one embodiment, a method of configuring closed captioning information for digital video is described. The method involves receiving one or more digital video parameters of a digital video presentation, selecting parameters from the received parameters to affect aspects of the closed captioning, and computing closed captioning parameters to drive the closed captioning data based on the selected digital video parameters.

In another embodiment, a system for configuring closed captioning for digital video is described. The system includes a digital video parameter receiver module, which is configured to receive digital video parameters for the presentation and select from those parameters from which closed captioning parameters can be computed. The system also includes a closed captioning parameter computation module, which is configured to compute closed captioning parameters from the selected parameters and the closed captioning data.

In yet another embodiment, one or more computer-readable media are described which contain instructions which cause a computer to perform a method when executed. The method performed involves receiving one or more digital video parameters of a digital video presentation, receiving closed captioning data to be included in the digital video presentation, selecting parameters from the received parameters to affect aspects of the closed captioning, computing closed captioning parameters to drive the closed captioning data based on the selected digital video parameters, and duplicating the received closed captioning data based on the computed closed captioning parameters.

Additional features and advantages of the invention will be made apparent from the following detailed description of embodiments that proceeds with reference to the accompanying drawings.

DETAILED DESCRIPTION

The following description is directed to techniques and systems for a closed captioning configuration system. The description presents an exemplary application of this technique in a computer system. The closed captioning configuration system provides a developer of digital video content with the ability to analyze a piece of digital video and compute configuration parameters for closed captioning data which is to be inserted into the digital video. By using the system, a captioner can determine settings, or parameters, which can then control the use of a closed captioning standard, such at the EIA-708 standard mentioned above. Because the system is robust and takes into account numerous parameters of the digital video content, it can be used in various situations, driving the proper closed captioning data in different situations.

1. Examples of the Closed Captioning Configuration System

Figure 1:
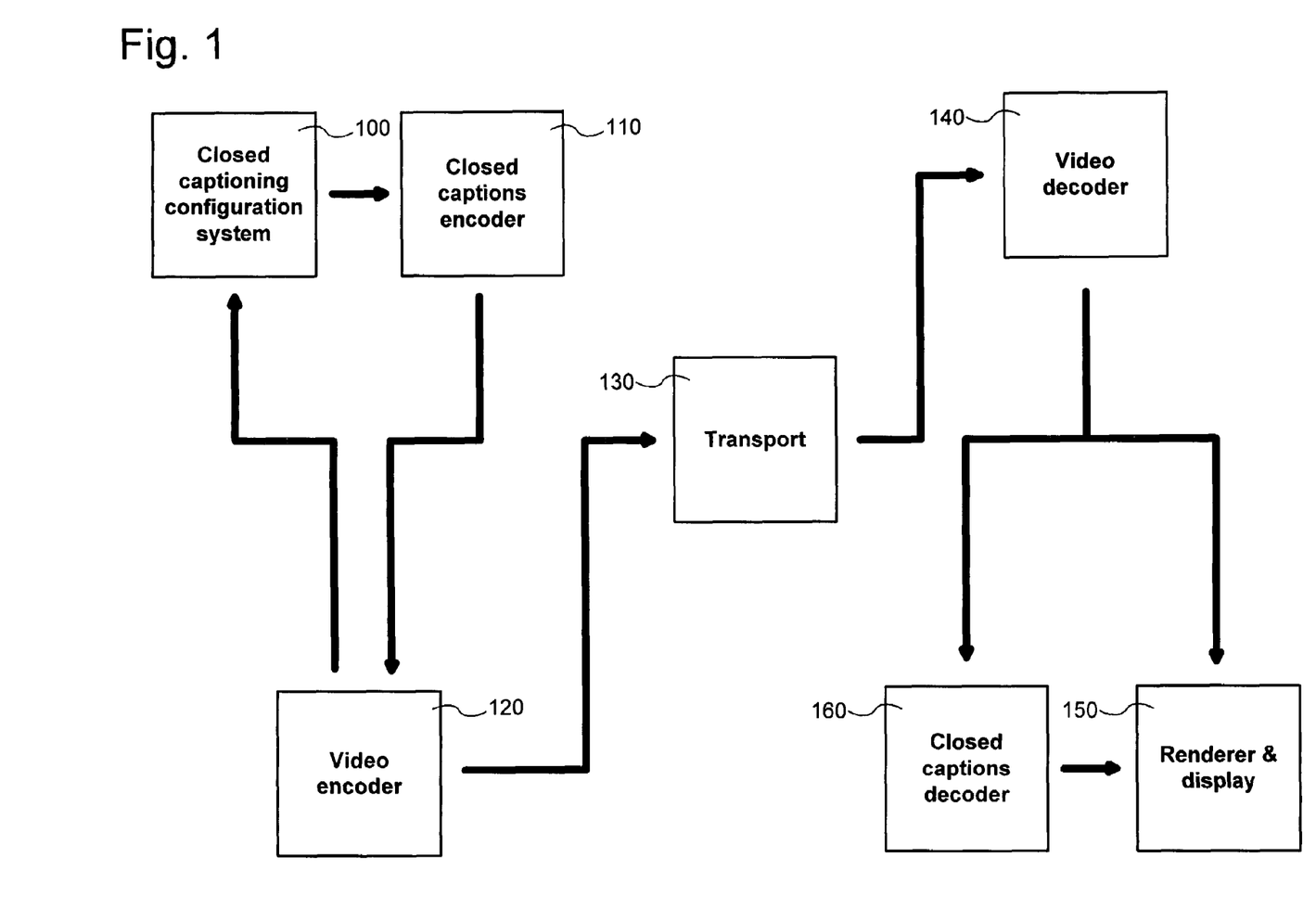
FIG. 1 is a block diagram of an exemplary implementation of a closed captioning configuration system in a computer system.

FIG. 1 illustrates an exemplary implementation of a closed captioning configuration system 100. In various implementations, modules illustrated in FIG. 1 may be combined, subdivided, or omitted altogether. FIG. 1 illustrates the interactions between the closed captioning configuration system 100, a closed captions encoder 110, and a video encoder 120. In one implementation, the configuration of closed captioning is performed with reference to a given digital video presentation, which is not illustrated. In one implementation, the video encoder is configured to encode in the SMPTE VC-1 standard; in another an MPEG standard may be used. In one implementation, the video encoder 120 receives a video sample and is tasked with encoding the sample into digital video. Thus, the video encoder 120 has knowledge of particular parameters of the encoded digital video presentation, and can communicate these parameters to the closed caption configuration system 100, as is illustrated by the arrow connecting the two modules. In one implementation, this parameter passing is performed by the passing of a data structure of predetermined type. An example of such a data structure will be discussed in greater detail below with respect to FIG. 3. In another implementation, parameters are not bundled into a single data structure. In various implementations, parameters may be passed for every frame of the digital video presentation that is encoded, may be passed relative to smaller video units, such as fields in an interlaced video presentation, or may be passed relative to larger blocks of video, including entire presentations.

FIG. 1 also illustrates that the closed captioning configuration system 100 communicates with a closed captions encoder. In one implementation, the closed caption encoder receives indications of captions which are to be included in an eventual captioned version of the digital video presentation and converts those captions into a known captioning format, for example EIA-608. In one implementation, the closed captioning configuration system 100 sends captioning or digital video parameters to the closed captions editor to "drive," or control, the creation of captions by the encoder. In one implementation, these driving parameters can include counts which indicate for how long a caption is to be displayed, and/or total numbers of bytes that must be encoded for a given frame or other subsection of the digital video presentation. As discussed above, these closed captioning parameters may drive creation of captions relative to individual frames, fields, other video units, or entire presentations. Finally, the closed captions encoder 110 interacts with the video encoder by sending encoded closed captioning data, created according to the parameters received from the closed captioning configuration system, to the video encoder in order to allow it to be combined to create a captioned video presentation.

While FIG. 1 illustrates the closed captioning configuration system 100, the closed captions encoder 110, and the video encoder 120 as separate software modules, in alternate implementations, the modules may be combined. Thus, the configuration system 100 and encoder 110 may be combined into a single captioning module in one implementation. Similarly, the configuration system 100 may be combined in one implementation with the video encoder 130 to encode video while producing driving data for an external closed captions encoder. In yet another implementation, all three modules may be combined into one.

FIG. 1 also illustrates the rest of the lifecycle of such a captioned video presentation. Block 130 illustrates a transport to a viewer. The transport 130 is not meant to illustrate any particular method of delivering an encoded captioned presentation to a viewer; it could include permanent or temporary storage, and/or the transmission of video data over a digital television broadcast network or an inter- or intranet with or without packetization of the digital video data. After the transport 130, the video is received by a video decoder 140. In one implementation, the video decoder is configured to decode SMPTE VC-1 video; in another implementation, the decoder 140 may decode MPEG-encoded video. The decoded video is then transmitted both to a closed captions decoder 160 and to a renderer & display 150. In one implementation, the closed captions decoder 160 is configured to isolate and decode EIA-708 data into textual and other closed captioning information. The closed captions decoder can then transmit this decoded captioning information to the renderer & display 150 in order to allow the captioning to be displayed along with the rest of the video presentation. In alternative implementations, the closed captions decoder and renderer & display are combined into a single software or hardware module.

Figure 2:
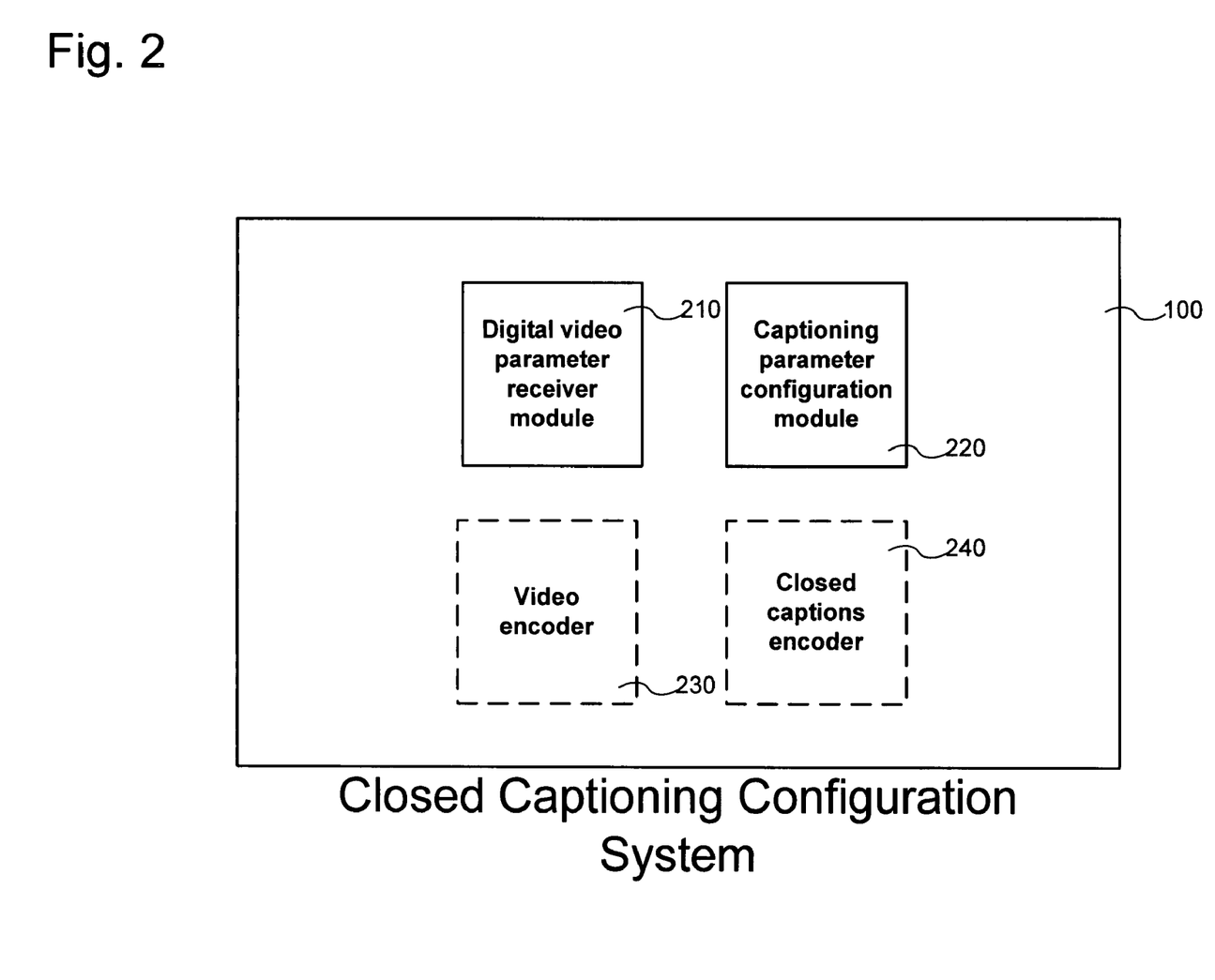
FIG. 2 is a block diagram of an exemplary implementation of the closed captioning configuration system of FIG. 1.

FIG. 2 illustrates an exemplary implementation of the closed captioning configuration system 100, including components. In one implementation, the closed captioning configuration system 100 includes at least a digital video parameter receiver module 210, and a captioning parameter configuration module 220. In alternative implementations, the closed captioning configuration system 100 may also include a video encoder module 230 or a closed captions encoder module 240. In various implementations, software modules may be joined, subdivided, or omitted altogether.

In one implementation, the digital video parameter receiver module 210 serves to receive parameters from a video encoder describing the digital video presentation to be captioned, and to select from those parameters ones which the captioning parameter configuration module 220 will need to drive a closed caption encoder. In another implementation, this module does not select parameters, but instead passes all parameters to the configuration module 220 or does not exist at all. In yet another implementation, the digital video parameter receiver module may choose to review only certain video parameters for each frame, ignoring others which are not germane to the particular type of video presentation. For example, if a particular video presentation consists of progressive (rather than interlaced) video, the digital video parameter receiver module 210 could ignore for each frame indicators of whether 3:2 pulldown is being used in the video, passing along to the configuration module other parameters as needed. This is particularly useful when the parameters are passed as a predefined data structure.

FIG. 2 also illustrates a captioning parameter configuration module 220, which in one implementation receives parameters from the digital video parameter receiver module 220 and uses these to compute parameters to drive a closed captions encoder, which are then exported to a closed captions encoder. In another implementation, the configuration module 220 receives all parameters received from a video encoder. The operation of the captioning parameter configuration module 230 is described in greater detail below. Finally, as discussed above, in various implementations, a video encoder 230 and/or a closed captions encoder 220 may be directly included in the closed captioning configuration system 100.

2. Examples of Parameter Types

Figure 3:
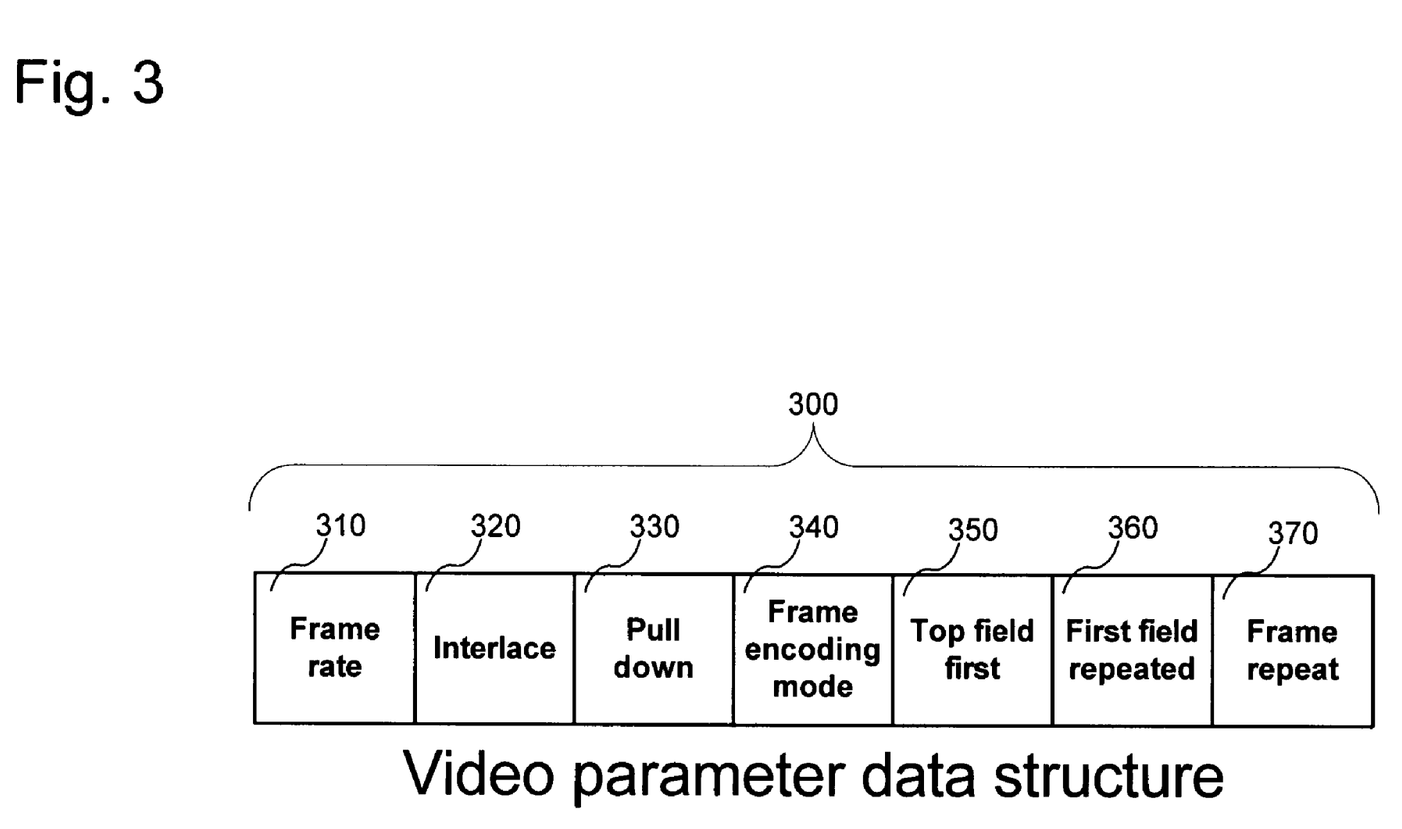
FIG. 3 is a block diagram of an exemplary implementation of a data structure comprising digital video parameters for use with the closed captioning configuration system of FIG. 1.

FIG. 3 illustrates an exemplary data structure 300 used to contain digital video parameters which may be used by the closed captioning configuration system 100. In one implementation, all of the parameters shown in FIG. 3 may be passed between a video encoder and the configuration system 100; in another, individual parameters may be omitted or filled with dummy values when not applicable to a particular situation. In yet another, the parameters illustrated in FIG. 3 may be passed directly, rather than as part of a data structure. In various implementations, parameters may be sent for an entire video presentation, for each frame of a presentation, or for other subunits of a presentation. While certain parameters are directly described below, other implementations may ignore one or more of these parameters or include ones not listed.

The first parameter illustrated in FIG. 3 is the frame rate 310. The frame rate describes the number of frames of video displayed per second. The interlace parameter 320 is an identifier which describes whether a given digital video presentation displays video as two interlaced fields (i.e. overlapping fields which each contain either only the odd or the even lines of a particular video frame) or as progressive frames, where the entire frame is drawn in one act. FIG. 3 next illustrates a pull down parameter, which in one implementation comprises an indicator of whether the presentation uses 3:2 pulldown, a technique used to duplicate some fields when converting a lower frame rate video presentation to one with a higher frame rate.

Next, the data structure 300 contains a frame encoding mode parameter 340. In one implementation, this parameter is used when the digital video presentation is encoded as an SMPTE VC-1 presentation, and it comprises an indicator of how frames are encoded. Examples of types of frame encoding modes include progressive, frame interlaced, and field interlaced. Because presentations which are field interlaced offer the ability to include captions at the field level, this parameter may be useful in some implementations. FIG. 3 also illustrates the top field first parameter 350, which in one implementation comprises an indicator of whether the top field of an interlaced frame must be displayed first or not, which is sometimes useful to know in the case that 3:2 pulldown is being used.

FIG. 3 also illustrates a first field repeated parameter 360, which in one implementation comprises an indicator of whether the first field of an interlaced frame must be repeated or not. Lastly, FIG. 3 illustrates a frame repeat parameter 370, which, in one implementation, comprises an indicator of the number of times a frame must be repeated when 3:2 pulldown is being used. In one implementation, the data structure 300 may be compacted by overloading two bits to represent either parameters 350 and 360, or parameter 370. In this implementation, two bits of the data structure represent the top field first parameter 350 and the first field repeated parameter 360 when describing interlaced video. Those bits are overloaded to also represent the two-bit frame repeat parameter when 3:2 pulldown is used with progressive video. In this implementation, such overloading is allowed because video will not be both progressive and interlaced at the same time. In another implementation, the parameters 350, 360, and 370 are not located in overloaded bits and are instead packed separately into the data structure 300.

Different parameters of data structure 300 of FIG. 3 may have different scope. In one implementation, parameters 310, 320, and 330 reside in a video sequence header while parameters 340-370 reside in a video frame header. In such an implementation, the value of the parameters can change on a frame by frame basis and/or on a sequence by sequence basis. This means that, in various implementations, modes of insertion of closed caption data into video elementary streams can vary from sequence to sequence or from frame to frame.

3. Examples of Processes of Closed Caption Configuration

Figure 4:
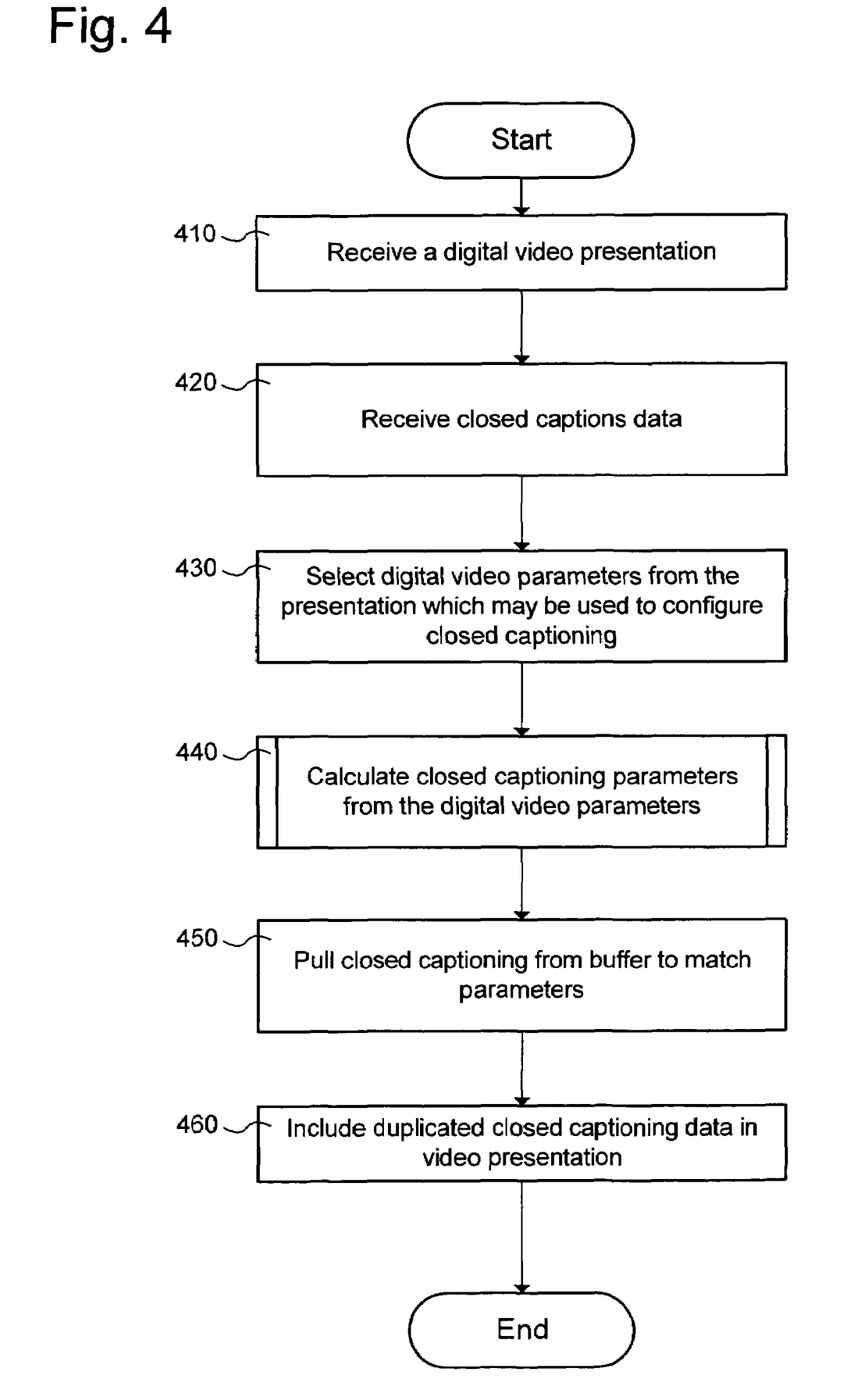
FIG. 4 is a flowchart illustrating an exemplary process for configuring closed captions using the closed caption configuration system of FIG. 1.

FIG. 4 is a flowchart illustrating one example of a process whereby the closed captioning configuration system 100 facilitates the captioning of a digital video presentation. Starting with block 410, a digital video presentation is received. In one implementation, the receipt of the presentation is from a video encoder 120. Next, closed captions data is received at block 420; in one implementation, this data comprises one or more closed caption records.

In a preferred implementation, the number of closed caption records received in the process of block 420 are commensurate with the intended display rate as signaled in the sequence header. So, if the video has been captured and encoded at a lower frame rate (for example a movie at 24 frames/sec), and the intended frame rate is 30 frames/sec, the closed captions must be delivered so that the rate at which new closed caption data are available keeps up with the display rate of 30 frames/sec. The processes of FIGS. 4 and 5 describe how to do that.

In one implementation the closed captions data is received into a buffer by the closed caption encoder 110, either from a file containing captioning information or from a user. In various implementations, the closed captions data may be received all at once or may be received over time during encoding.

FIG. 4 then illustrates, at block 430, that digital video parameters which may be used to configure the closed captioning are selected according to the desired digital video presentation. In one implementation, the parameters are set by the video encoder 120 and sent as a data structure, such as data structure 300, to the configuration system 100. Next, at block 440, the closed captioning parameters are calculated from the digital video parameters. This process is described in greater detail below with respect to FIG. 5.

The process continues to block 450, where the number of closed captioning records are then pulled from the closed caption buffer of the closed caption encoder 110 based on the closed captioning parameters calculated by the process of block 440. Finally, at block 460, the closed captioning data is included in the video presentation in order to create a captioned video presentation. In one implementation, this is performed by the video encoder 120.

Figure 5:
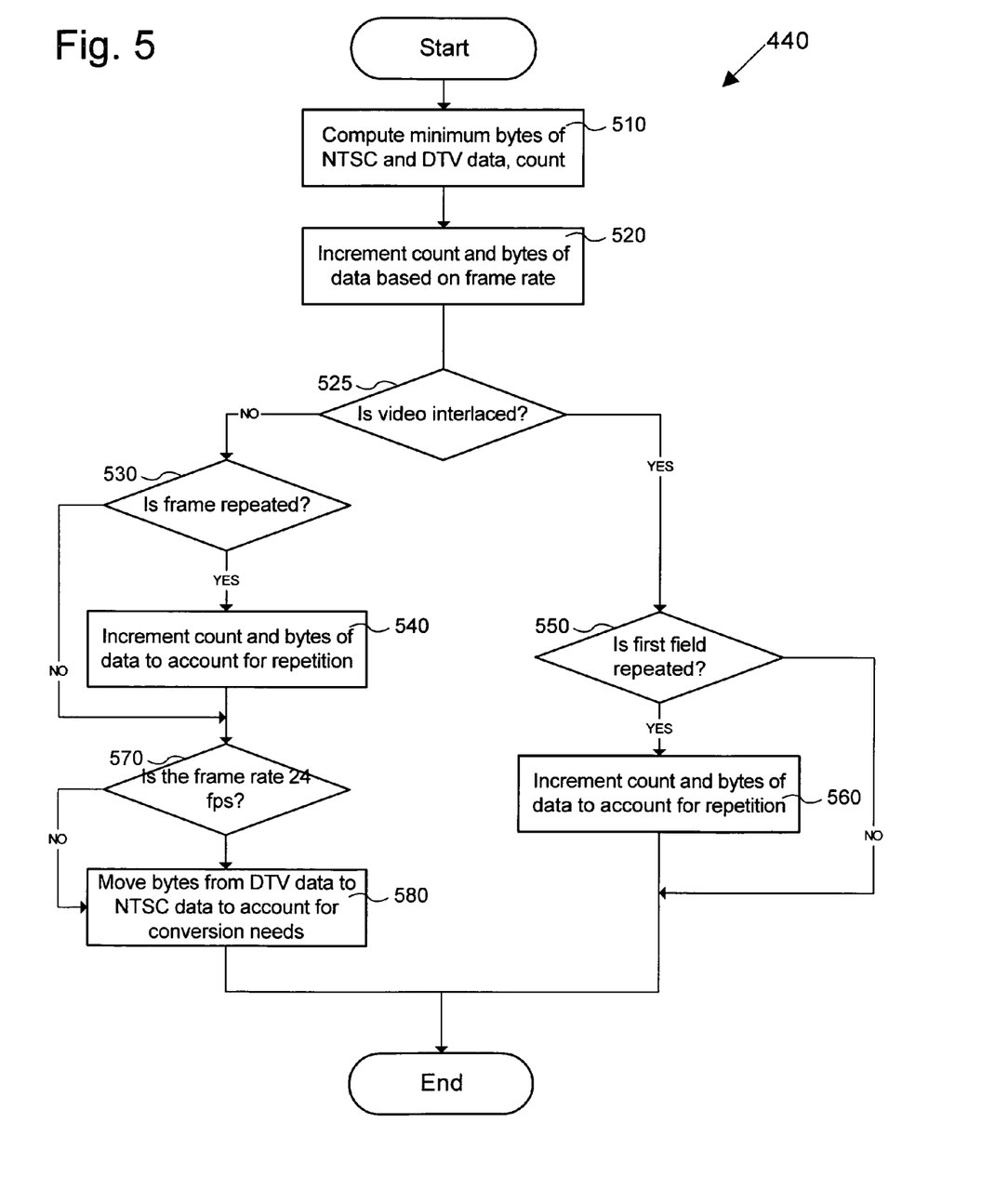
FIG. 5 is a flowchart illustrating an exemplary process performed by the closed captioning configuration system of FIG. 1 for computing closed captioning parameters.

FIG. 5 is a flowchart illustrating the process of block 440 of FIG. 4 for calculating closed captioning parameters. In the example illustrated in FIG. 5, the closed captioning parameters being calculated are a number of closed captioning data bytes, and the length of a time count. The number of closed captioning data bytes in one implementation is the total number of bytes needed to contain the captioning for the length of the time count. In one implementation the number of bytes is a combination of the number of bytes used in a standard NTSC EIA-608 closed captioning scheme, plus additional bytes according to the EIA-708B digital closed captioning scheme. Because EIA-708B has been expanded from the EIA-608B protocol to provide additional auxiliary data services, often referred as DTVCC packets, it is possible to transmit extra bytes according to the scheme.

The process of FIG. 5 begins at block 510, where the minimum count and number of bytes of NTSC and DTV data are calculated. In one implementation the minimum is taken for the fastest likely frame rate. Thus, for a single frame being displayed at 60 frames per second, an example count would be 10 with byte totals of 2 NTSC bytes and 18 DTV bytes. These numbers are obtained through reference to the ATSC a/53B standard for packetizing closed captions. In alternative implementations, different minimum counts and bytes may be used depending on the closed captioning scheme used.

The process continues at block 520, where the desired frame rate is read from the frame rate parameter and the count and bytes of closed captioning data are incremented in order to account for the desired frame rate. In one implementation the frame rate parameter comprises display rate metadata specified in the sequence header of the video elementary stream; the video frame rate metadata is typically inserted in the sequence header by the video encoder.

The process then continues to decision block 525, where it is determined if the video is interlaced or progressive. If the video is not interlaced, the process continues to decision block 530, where the closed captioning configuration system determines if the frame is repeated or not. In one implementation, this is done by inspecting the value of the frame repeat parameter. If the frame needs to be repeated, at block 540 the count and bytes are then incremented according to the number of copies of the frame to account for the repetition.

Finally, the process continues to decision block 570. At decision block 570, it is determined if the desired frame rate is 24 (or 23.97) frame/sec. If not, the process then ends. If so, the number of bytes is determined to provide an average of 120 bytes per seconds (corresponding to 2 bytes per fields in a 30 frames/sec display system). More specifically, in the case of a 24 frames/sec display system, 4 out of 5 frames have 4 NTSC closed caption bytes and 1 out of 5 frames have 6 NTSC closed caption bytes. Thus, in Block 580, the appropriate number of NSTC closed caption bytes and auxiliary DTV bytes is determined and the process then ends.

If the video is found at decision block 525 to be interlaced, the process instead continues to decision block 550, where in one implementation it is determined whether the first field is repeated by inspecting the first field repeated parameter. If not, the process then ends. If so, the process continues to block 560, where the count and/or bytes are incremented to account for the repetition and the process then ends.

4. Examples of Parameters

Figure 6:
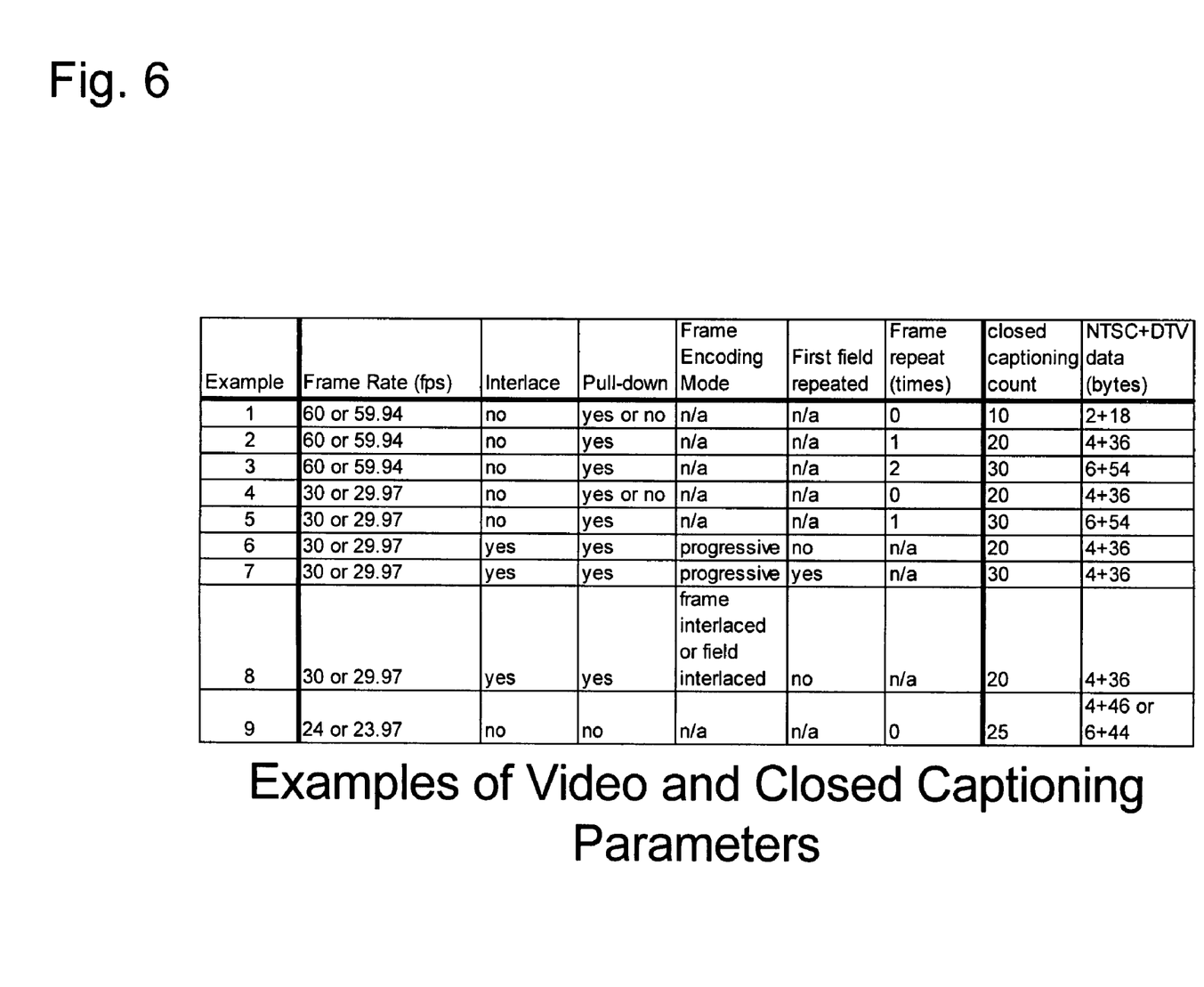
FIG. 6 is a chart illustrating examples of digital video and closed captioning parameters as used and produced by the closed captioning configuration system of FIG. 1.

FIG. 6 illustrates a table showing some exemplary sets of digital video parameters and the corresponding closed captioning parameters created by the process illustrated above. Inspection of the examples of FIG. 6 will illustrate how the process of FIG. 5 modifies the closed captioning parameters. In the examples shown, all closed captioning is added at the frame level.

In alternative implementations, certain sets of parameters could allow for inclusion of closed captioning data at the field level as opposed to the frame level. For example, example line 1 illustrates two sets of parameters which include 60 frame per second frame rate and do not differ in either frame repetition or field repetition. Thus, they compute to both the same closed captioning count and bytes of closed captioning data. Example lines 2 and 3, however, each differ in the number of times the first field is repeated, and see their closed captioning parameters multiplied accordingly.

Example line 4 illustrates incrementing the minimum parameters to account for a different frame rate. By comparing example line 1 and 4, one can see that line 4, showing a frame rate half the speed of line 1, shows a doubling in its closed captioning parameters. Example line 5, however, shows an increase in the closed captioning parameters because, unlike the example of line 4, it shows the frame being repeated once repeated. Thus, the closed captioning parameters are increased by 50%. This example represents a typical 3:2 pulldown case where the input material has been encoded at 24 frames/sec and the desired display rate is 29.97 frames/sec.

Example line 6 and 7 illustrate cases where the content is signaled as interlaced but the video frames are encoded as progressive. This is a case similar to example lines 4 and 5 where the input content is progressive. In example line 6, the first field repeated parameter is set to "no" so no additional closed caption data need to be transmitted. In example line 7, the first field repeated parameter is set to "yes" and the count must be increased to account for the repetition of the first field.

Example line 8 shows the case of interlaced 30 frames/sec content which is typically not subject to any field doubling. The value of the first field repeated parameter remains set to "no". Regardless of whether the encoding mode is interlaced frame or interlaced fields, the number of closed caption bytes remains the same. Finally, in example line 9, which illustrates a 24 frames/sec display case, there is a need to supply an amount of closed captions data that is similar to the amount of closed captions data in a 30 frames/sec display case. For this reason, the number of NTSC closed captions needs to be increased to 6 once every 5 frames and then reset back to 4 for the next 4 frames.

5. Computing Environment

The above described closed captioning configuration system 100 and configuration techniques can be implemented on any of a variety of computing devices and environments, including computers of various form factors (personal, workstation, server, handheld, laptop, tablet, or other mobile), distributed computing networks, and Web services, as a few general examples. The closed captioning configuration system 100 can be implemented in hardware circuitry, as well as in closed captioning configuration software 780 executing within a computer or other computing environment, such as shown in FIG. 7.

Figure 7:
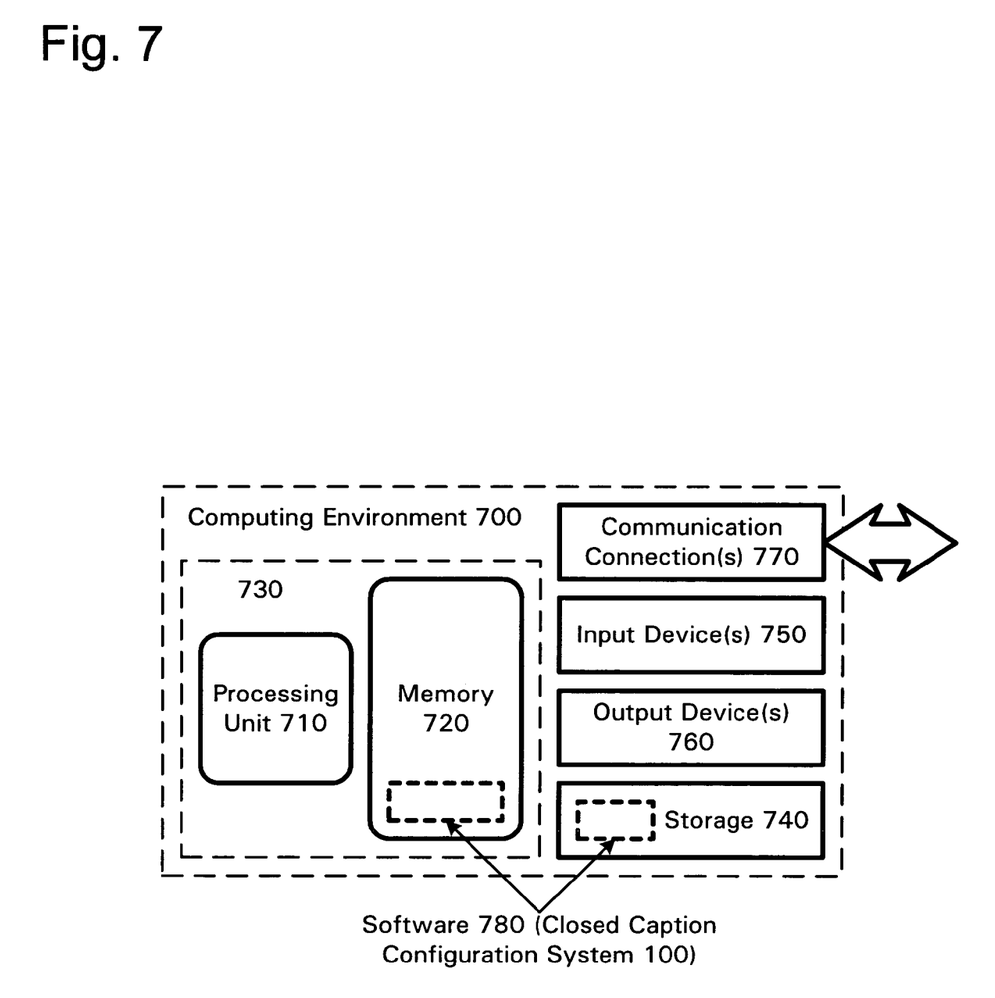
FIG. 7 is a block diagram of a suitable computing environment for implementing the closed captioning configuration system of FIG. 1.

FIG. 7 illustrates a generalized example of a suitable computing environment 700 in which the described techniques can be implemented. The computing environment 700 is not intended to suggest any limitation as to scope of use or functionality of the invention, as the present invention may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing the closed captioning configuration system.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the closed captioning configuration software 780.

The input device(s) 750 (e.g., for devices operating as a control point in the closed captioning configuration system 100) may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The closed captioning configuration techniques herein can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

In view of the many possible embodiments to which the principles of our invention may be applied, we claim as our invention all such embodiments as may come within the scope and spirit of the following claims and equivalents thereto.

I claim:

1. A method of configuring closed captioning information for digital video, the method comprising:
   receiving one or more digital video parameters of a digital video presentation;
   selecting parameters from the received digital video parameters, the selected parameters selected to affect aspects of closed captioning; and
   based on the selected digital video parameters, computing closed captioning parameters to drive the closed captioning data.

2. The method of claim 1, further comprising:
   receiving a digital video presentation; and
   analyzing the digital video presentation to determine parameters of the digital video presentation.

3. The method of claim 2, further comprising encoding sampled video into a digital video presentation.

4. The method of claim 1, further comprising:
   receiving closed captioning data to be included in the digital video presentation; and
   pulling the received closed captioning data from a buffer based on the computed closed captioning parameters.

5. The method of claim 1, wherein the closed captioning parameters include a closed captioning time count and a number of bytes of closed captioning data.

6. The method of claim 1, wherein the digital video parameters are received for every frame of the digital video presentation.

7. The method of claim 6, wherein the closed captioning parameters are computed for every frame of the digital video presentation.

8. The method of claim 1, wherein the selected parameters include an indication of whether the digital video presentation is interlaced.

9. The method of claim 1, wherein the selected parameters include an indication of whether 3:2 pulldown is utilized in the digital video presentation.

10. The method of claim 1, wherein the selected parameters include indications of the frame encoding mode used in the digital video presentation.

11. The method of claim 1, wherein the selected parameters include an indication of whether a field or a frame is to be repeated.

12. The method of claim 1, wherein the digital video presentation conforms to the SMPTE VC-1 standard.

13. The method of claim 1, further comprising encoding the closed caption parameters under the EIA-708B standard.

14. A system for configuring closed captioning for digital video, the system comprising:
    a digital video parameter receiver module, configured to receive digital video parameters for the digital video presentation and select parameters from which closed captioning data can be configured; and
    a closed captioning parameter configuration module, configured to compute closed captioning parameters from the selected parameters.

15. The system of claim 14, further comprising:
    a video encoding module, configured to create the digital video presentation and to provide digital video parameters for the digital video presentation to the digital video parameter receiver module; and a closed captions encoding module, configured to receive information for closed captioning and create closed captioning data in accordance with the closed captioning parameters.

16. The system of claim 15, wherein the video encoding module comprises a separate piece of software from the digital video parameter receiver module, and closed captioning computation modules.

17. One or more computer-readable media containing instructions which, when executed, cause a computer to perform a method comprising:

receiving one or more digital video parameters of a digital video presentation;

receiving closed captioning data to be included in the digital video presentation;

selecting parameters from the received digital video parameters, the selected parameters selected to affect aspects of closed captioning;

based on the selected closed caption parameters, computing closed captioning parameters to drive the closed captioning data; and pulling the received closed captioning data from a buffer based on the computed closed captioning parameters.

18. The computer-readable media of claim 17, wherein the method further comprises:

receiving a digital video presentation; and analyzing the digital video presentation to determine parameters of the digital video presentation.

19. The computer-readable media of claim 17, wherein the closed captioning parameters include a closed captioning time count and a number of bytes of closed captioning data.

20. The computer-readable media of claim 17, wherein:

the digital video parameters are received for every frame of the digital video presentation; and the closed captioning parameters are computed for every frame of the digital video presentation.

* * * * *